United States Patent [19]

Brewer

[11] Patent Number: 5,082,321

[45] Date of Patent: Jan. 21, 1992

[54] AIR STREAMLINING DEFLECTOR SHIELD FOR A MOTOR VEHICLE

[76] Inventor: Shelby L. Brewer, 793 Johnsonway, Sandy, Utah 84094

[21] Appl. No.: 644,298

[22] Filed: Jan. 22, 1991

[51] Int. Cl.$^5$ ................................. B60J 1/20
[52] U.S. Cl. ....................................... 296/91
[58] Field of Search ................ 296/91, 180.1

[56] References Cited

U.S. PATENT DOCUMENTS

| | | | |
|---|---|---|---|
| 2,243,029 | 5/1941 | Cupit | 296/91 |
| 2,644,716 | 7/1953 | McVicker | 296/91 |
| 3,022,848 | 2/1962 | Heiser | 296/91 |
| 3,695,674 | 10/1972 | Baker | 296/91 |
| 4,842,319 | 6/1989 | Biegler et al. | 296/91 |

*Primary Examiner*—Robert R. Song

[57] ABSTRACT

A single piece air streamlining deflector shield for a motor vehicle that is mounted transversely, behind the leading edge of the hood of the vehicle, and which because of unique shape and construction is self-supporting transversely over the hood to sub-surface mounting positions on the inner lateral edges of the hood, and has a shape and construction that directs a volume of generally oncoming air, incident the front of said vehicle when in a forward motion, to pass unobstructed by the shield or mounting hardware under as well as over the leading edge of the shield. The shield then directs the airflow both over the upper surface and under the lower surface of the shield to combine behind the rearward edge of the shield, there conjoining to form a far superior dynamic airflow which is then, because of the aforementioned shape of the shield, more accurately directed over and around the windshield of said vehicle to deflect debris and streamline airflow.

7 Claims, 3 Drawing Sheets

AIR STREAMLINING DEFLECTOR SHIELD FOR A MOTOR VEHICLE

BACKGROUND OF THE INVENTION

This invention relates to deflector shields for motor vehicles, and more specifically to air streamlining deflector shields designed to use the air currents directed by the shields to facilitate the flow of the air around and over the windshields of motor vehicles.

To date many efforts have been made to improve the efficiencies of motor vehicles. Most current design efforts are towards more efficient engines and low drag coeficient body designs. In conjunction with this is the need to improve the efficiencies of vehicles already produced with the use of add on accessories. Some of these efforts which are designed to deflect air to protect the integrity of the windshield are reflected in the prior issued U.S. Pat. No. 4,040,656 to Alian Jean-Marie Clenet and U.S. Pat. No. 4,043,587 to Michael A. Giallourakis which are mounted on the top surface of the hood of a vehicle behind the leading edge of the hood but which do not direct the air in a complete and specific enough manner around and over the windshield area of the vehicle and which are not designed to be self-supporting transversely above the surface of the hood, but rather are intended to be placed or mounted directly on the surface of the hood.

Other related patents on bug and gravel type shields mounted on the leading edge of a vehicle are disclosed in U.S. Pat. No. 4,153,129 to Patrick J. Redmond and U.S. Pat. No. 4,518,191 to Robert D. Williams and James Mastin. These shields are made in a manner where a horizontal channel is fabricated in such a way as to receive the lower edge of the shield and then attaching brackets are secured to the horizontal channel so the assembled piece can then be attached to the vehicle, but these shields do not embody the simplicity and ease of manufacture of a complete one piece construction.

Another patent of a similar configuration and mounting location illustrates a shield made of a one piece construction such as U.S. Pat. No. 4,846,522 to Douglas L. Bonstead, Ronald D. Mastin, and Carl W. Langren in which is disclosed an extruded shield which is formed so as to be thicker over a horizontal portion of the shields base so the shield can be mounted without the use of a separate horizontal channel, but this shield directs the air in a very general direction rather than specifically towards the outer surface of the vehicle surrounding the windshield.

Another shield of mention is the one by Thomas I. McDaniel disclosed in U.S. Pat. No. 4,547,013 in which he discloses a shield formed so as to have four angled surfaces on the face of the shield causing the shield to deflect air upwardly and downwardly as well as to the outer sides thereof, but this shield is not intended to be specifically placed behind the leading edge of the hood of a vehicle.

In addition to the foregoing U.S. Pat. No. 4,842,319 to John H. Ziegler G. R. Oakley, and Daniel F. Krause discloses a deflector shield which is part of a system, but which can also be used alone. The shield is described as being a molded wrap-around type which is designed to attach with brackets to the exposed side edge as well as the top leading edge of the vehicle, but this design only allows the shield to use the air passing over the shields upper surface, thereby not allowing the dynamic effect of a shield which allows air to pass under as well as over the surface of the shield. There are many other Patents that relate to the aforementioned types of deflector shields.

Other related prior art is mentioned in U.S. Pat. No. 3,910,623 to Joseph E. McKeen wherein is disclosed that air from a nozzle system is directed across the front contour of a vehicle up across the windshield tending to flow back along the vehicles roof, thereby influencing the air flow over the windshield. This use requires a forced air nozzle system to be built into or aftermarket installed in the vehicle which could be a considerable expense and does not embody the ease of mounting and dismounting, particularly without the use of tools, or the simplicity of use of a single piece shield with the mounting apparatus being an integral part of the body of the shield.

Whatever the precise advantages, features, and merits of the aforementioned inventions none of them fulfills or achieves the desired intent as well as the present invention. It should also be noted that there are vehicles for which most of the previously described inventions are not at all particularly suited like the Volkswagen Beetle, which was the prototype vehicle for the present invention.

It has now been discovered that a single piece of thermoplastic material can comprise a shield that can cross the hood of a vehicle, and can be supported to mounting locations on the lateral edges of the hood by shape and construction of the shield, thereby not requiring attachments to the top surface or the leading edge of the hood. Hence avoiding marring of the top surface of the hood, and also allowing air to pass under as well as over the surface of the shield. Thereby producing much stronger and more directing airflow to deflect debris as well as to streamline the airflow over and around the windshield of the vehicle.

Hereinafter will be disclosed the means and methods of accomplishing the primary objectives of the invention as well as others which will be apparent in the detailed description that follows.

SUMMARY OF THE INVENTION

The object of this invention is to provide a novel air streamlining deflector shield which is capable of being mounted behind the leading edge of the hood of a vehicle, and which when the vehicle is in a forward motion, allows air current to pass under as well as over the surface of the shield to conjoin at the rearward edge of said shield for a more dynamic effect to streamline airflow and protect the integrity of the windshield.

Another object of the present invention is to provide a shield that is so shaped and constructed as to be self supporting transversely over the surface of the hood so as not to require mounting or supporting attachments that will attach to or mar the surface of the hood.

A further object of the present invention is to provide a shield that is shaped and constructed so as to more accurately deflect the air current specifically to the outer surface area of the vehicle surrounding the windshield, thereby more correctly streamlining the airflow.

An additional object of this invention is to be economically made of a one piece construction wherein the attaching portions of the shield are integral extensions of the body of the shield, and are constructed to be easily mounted or dismounted to the sub-surface lateral edges of the hood without the use of tools.

According to the previously stated objects the present invention is disclosed comprising: a one piece flexible polymeric material, formed from an elongated piece of said material, shaped and constructed to be mounted transversely over the hood of a vehicle, molded into a generally bowed somewhat forwardly angled shape that has a leading edge, a rearward edge, and an upper and lower surface therebetween. Said leading edge being lower in position at the forward axis of the leading edge than said rearward edge. Said shield having mounting portions located on the lateral ends of the shield which are integral extensions of the body of the shield, which along with the aforementioned shape and construction allow the shield to be self-supporting over the surface of the hood to the sub-surface mounting positions located on the inner lateral edges of the hood. Said shape and construction allowing a volume of air, when the vehicle is in foreward motion, to pass under as well as over the shield. Said shape and construction then directing said dynamic air volume, conjoined at the rearward edge of the shield, specifically to the outer surface of the vehicle surrounding the windshield.

Thereby affording a shield of considerable economy in manufacture and use as well as a shield with a much more dynamic capability for streamlining airflow and deflecting debris around and over the windshield area of a motor vehicle.

These along with other objects and advantages of the present invention are hereinafter disclosed and described in the accompanying figures and the detailed description and claims that follow.

DESCRIPTION OF PREFERRED EMBODIMENT

Figure 1:
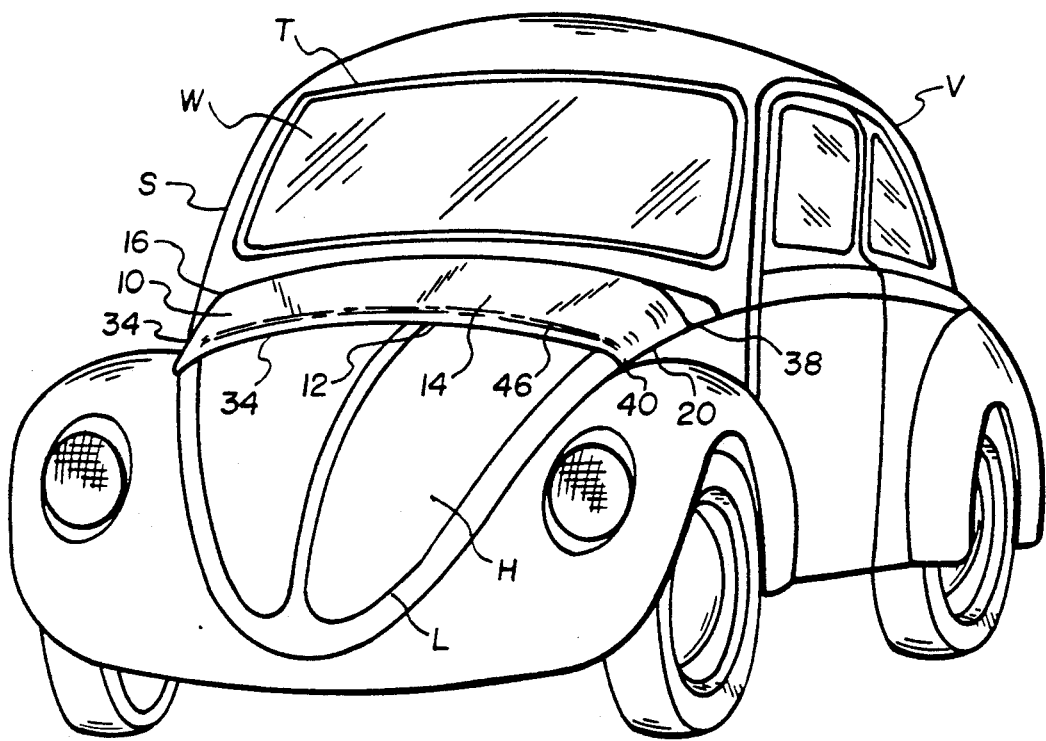
FIG. 1 is a perspective view of the preferred embodiment of the present invention as mounted transversely over the hood of a Volkswagen Beetle.

Herein is disclosed the detailed description of the preferred embodiment of the present invention, which will hereinafter be described as the shield 10. This embodiment of the shield 10 is disclosed as mounted on a Volkswagen Beetle as illustrated in FIG. 1. Though the shield 10 is an accessory designed initially for the Volkswagen Beetle V and offering premiere efficiency for said vehicle, the shields conformability and application for use on other vehicles will be apparent.

The windshield W of the Volkswagen Beetle V is generally flat across the forward facing surface both longitudinally and across the width thereof. Because the windshield W is mounted in a very upright, less inclined to the vertical, position on the vehicle, and because of the aforementioned flat surface, the airflow incident the forward moving vehicle is greatly restricted both over the top T and to the side S of said vehicle.

Figure 2:
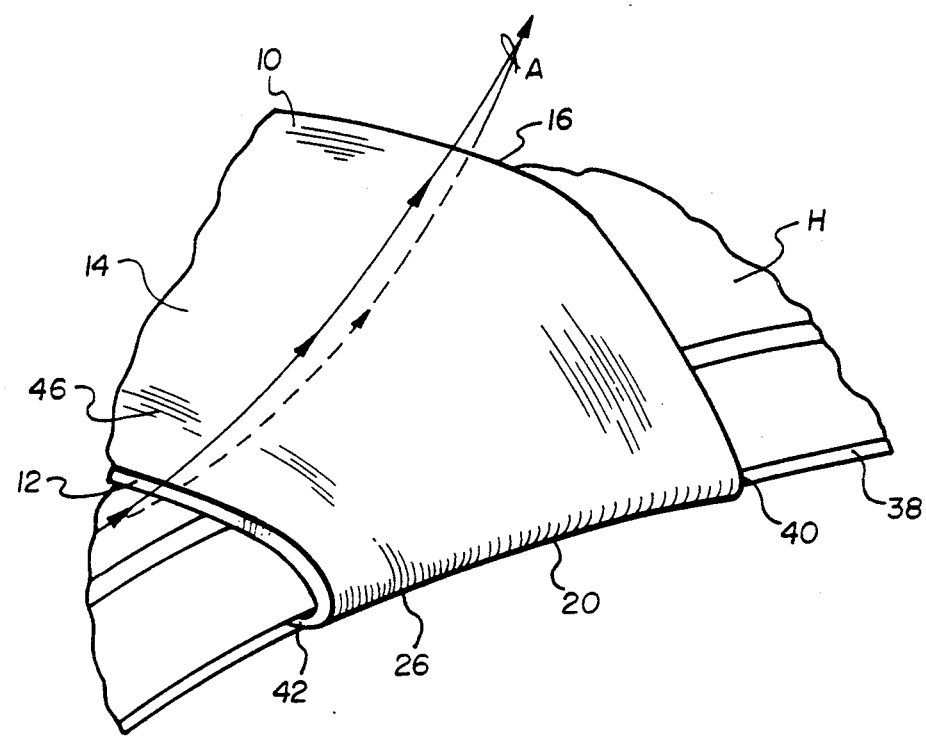
FIG. 2 is an enlarged partial perspective of the shield of FIG. 1.
Figure 5:
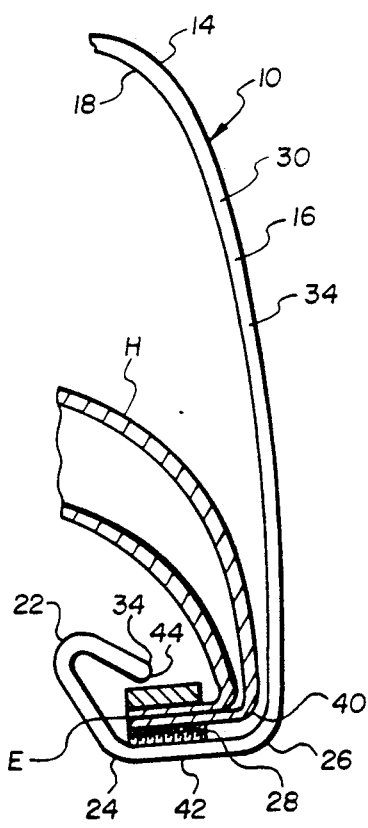
FIG. 5 is an enlarged view of the right rear edge of the attaching portion of the preferred embodiment of the shield with a partial cross-sectional view of the hood.
Figure 6:
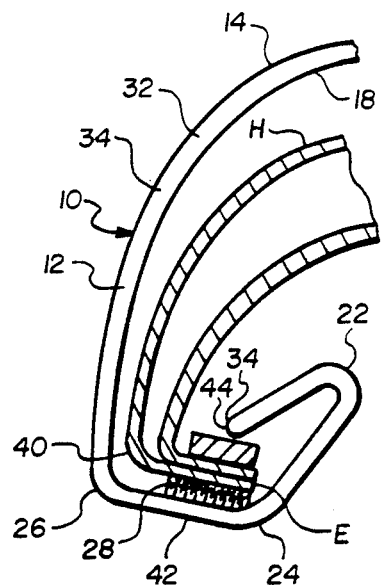
FIG. 6 is an enlarged view of the right front edge of the attaching portion of the preferred embodiment of the shield with a partial cross-sectional view of the hood.

The present invention is generally comprised of a one piece, flexible, transparent, polymeric material of the type that has considerable impact resistance and strength, and is amenable to conventional molding techniques. Formed into a generally elongated shape with a rearward edge 16 that is generally longer across the longitudinal surface of the shield than the leading edge 12. With edges 34 generally radiused for strength. Molded into a somewhat forwardly angled generally bowed shape and mounted transversely over the hood H, rearward the leading edge L of the hood H, the shield 10 is self-supporting and does not attach to the exposed surface of the hood H, but as seen from a consideration of FIGS. 1 and 2, enters at the seam 38 formed at the lateral edge 40 of the hood H and is there securely attached to the hood H as described hereinafter. Thereby allowing the hood H to be opened and closed without removing the shield 10. The attaching portions 42 of the shield 10 as noted from FIGS. 3-6 are located on the lateral side ends of the shield 10 and are generally intended to be out of view when the hood H is securely closed. The attaching portions 42 are integral extensions of the body of the shield 10 and are formed for the preferred embodiment of the shield 10 by making three generally parallel bends 22-26 directed inwards the curve of the bowed shape of the shield 10 and made generally parallel the lateral side edges 44 of the shield 10. The bends 22-26 working together facilitate mounting, dismounting, and securement of the shield 10. The attaching portions 42 of the shield 10 are assisted by the use of a cooperating hook and loop attaching device 28, as best seen in FIGS. 5 and 6, applied using common means to the shield 10 along the upper facing surface between the 2nd. 24 and 3rd. 26 aforementioned bends and the inside inner edge E of the hood H somewhat equal to the width of the shield 10 at the point where the shield 10 enters the seam 38 for mounting to the hood H as best depicted in FIG. 2. Therefore when the shield 10 is placed properly oriented over the hood H with the attaching portions 42 of the shield 10 placed below the lateral edges 40 of the hood H and raised in a generally upwards motion, the attaching portions 42 of the shield 10 engage, concomitant the cooperating hook and loop attaching device 28, adding additional seducement, the hood H. Dismounting is generally the reverse of the mounting procedure with the addition of pressure between the lateral edges 44 and the bends 22 of the shield 10 in a direction inwards the bowed shape of the shield 10.

Figure 3:
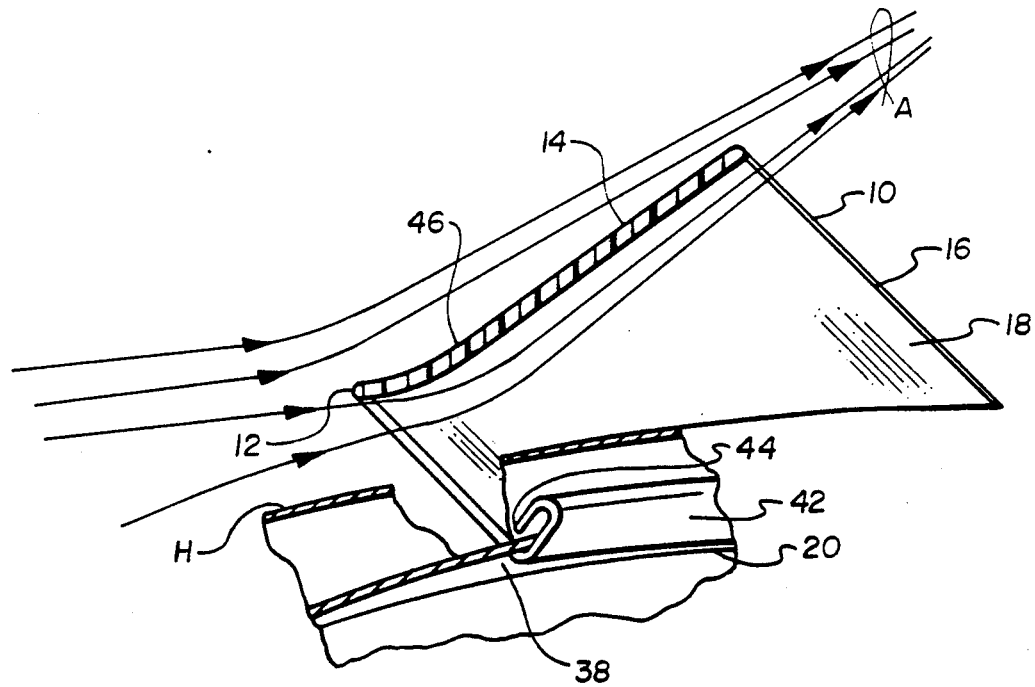
FIG. 3 is an enlarged partial plane view of the underside of the shield of FIG. 1 with a cut away view of the inner side edge of the hood and a partial view of the mounting portion of the shield.
Figure 4:
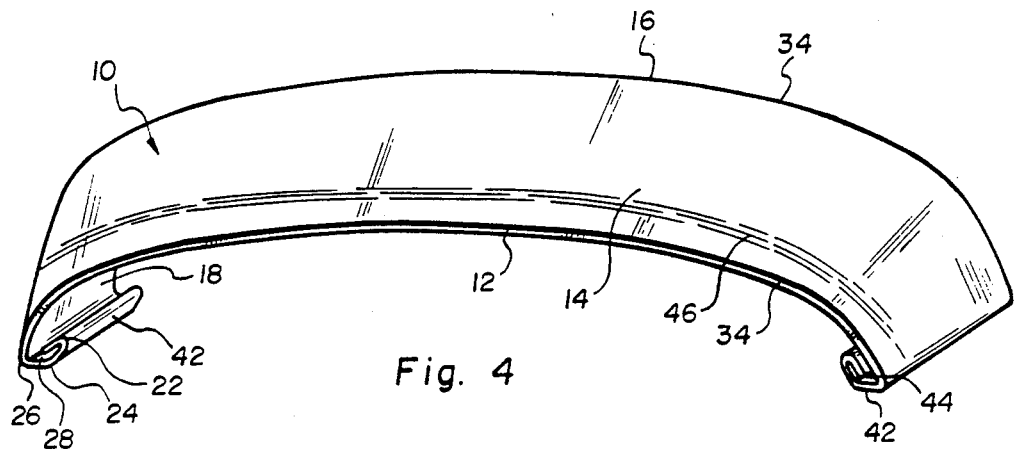
FIG. 4 is an enlarged perspective view of the preferred embodiment of the shield of FIG. 1.

The said shield 10 when constructed and secured as aforementioned is capable of being self-supporting transversely across the hood H and is thereby able to direct a volume of generally oncoming air incident the front of the vehicle, which shall hereinafter be referred to as the air currents A, to pass unobstructed by the shield 10 or mounting hardware, under the leading edge 12 as well as over the upper surface 14 of the shield 10 during forward motion of the vehicle, as is best seen in FIGS. 2-3. The air currents A incident the front of the shield 10 are directed at a generally upwards angle from the leading edge 12 of the shield 10 both over the upper surface 14 and under the lower surface 18 to combine at the rearward edge 16 of the shield 10 there conjoining for superior dynamic effect to deflect debris and streamline airflow. The molded shape of the shield 10 being generally bowed and somewhat forwardly angled from the sub-surface mounting positions as illustrated in FIG. 3 directs air current incident sidewards the axis of the bowed shape at the leading edge 12 of the shield 10 in a progressively sidewards direction. The rearward edge 16 of the shield 10, as illustrated in FIGS. 1-5, being molded to conform in scale somewhat to the shape of the vehicle at the windshield area where the deflected air current A will pass over and around said vehicle surface, and the leading edge, as illustrated in FIGS. 1-4 and 6, being molded to conform somewhat to the general shape of the hood H, somewhat elevated the surface at the point where the leading edge 12 crosses the hood H, combined with a slightly concave shape 46, as best depicted in FIG. 3, rearward the leading edge 12 crossing mostly the upper surface 14 of the shield 10, the lower surface 18 conforming conversely to the upper surface 14, to generally form the shape of the preferred embodiment of the shield 10. Additional strength and or effect being added to the shield 10 by differing shape crossing mostly the length of the surface of the shield.

Herein have been described and illustrated the embodiments of the present invention. Demonstrating the shields considerable ability to satisfy the need for a streamlining deflector shield designed to more correctly streamline air currents and to more efficiently, with more force, deflect debris around and over the windshield of a vehicle. Of course positioning of the shield 10 on a vehicles hood for optimum effect will vary with different hood designs and desired effects. It is to be therefore understood that various changes in the size, arrangement, or shape of the shield 10 may be made according to the scope of the invention and in accordance with the spirit of the claims hereinafter listed.

What is claimed is:

1. An air streamlining deflector shield comprising: a one piece flexible polymeric plastic material mounted transversely behind a forward edge of the hood of a vehicle, said shield having a leading edge and a rearward edge and being generally elongated in shape and being molded to a generally bowed shape somewhat forwardly angled from sub-surface mounting positions of said shield, as to place the leading edge of the shield below the rearward edge of the shield in relation to the horizontal plane of the vehicle, said shield being shaped and constructed to be self-supporting to attaching portions of the shield located at lateral side ends of the shield, said attaching portions being shaped and constructed to be sub-surfacely mounted to lateral edges of the hood, said shield's shape and construction directing a volume of generally oncoming air, incident the leading edge of said shield, to pass under as well as over the shield, said shield having an upper and lower surface, said leading edge having a molded shape to conform somewhat to the general shape of the hood somewhat elevated at the point where the leading edge crosses the hood, said rearward edge having a molded shape to generally conform in scale to the shape of the vehicle where deflected air current will pass over and around the vehicle when said vehicle is in forward motion, said shield between the leading and the rearward edge of the shield having a slightly concave shape rearward the leading edge crossing mostly the upper surface, said shape and construction directing the aforementioned air current under as well as over the entire exposed leading edge as well as across the upper and lower surface of the shield to combine generally just beyond the rearward edge of the shield where said directed air currents conjoin for superior effect to streamline airflow and deflect debris.

2. The shield of claim 1 wherein said attaching portions are located at the lateral side ends of the shield with said attaching portions being integral extensions of the shield.

3. The shield of claim 2 wherein said attaching portions are formed with three generally parallel bends directed inwards the curve of the bowed shape of the shield made generally parallel the lateral edges of the shield, said bends being made to generally conform to an inner sub-surface of the lateral edges of the hood for mounting, dismounting, and securement.

4. The shield of claim 3 wherein the addition of a cooperating hook and loop attaching device is secured to the attaching portions of the shield and the lateral edges of the hood, by common means, to work in conjunction with the attaching portions of the shield.

5. The shield of claim 4 wherein the attaching portions of the shield are comprised of 2 bends instead of 3 made inwards the curve of the bowed shape of the shield made generally parallel the lateral side edges of the shield, said bends being made to generally conform to the inner sub-surface of the lateral edges of the hood for mounting, dismounting, and securement.

6. The device of claim 5 wherein the attaching portions of the shield are comprised of 1 bend rather than 2 made inwards the curve of the bowed shape of the shield, said bends made generally parallel the lateral edges of the shield, said bends being made to generally conform to the inner sub-surface of the lateral edges of the hood for mounting, dismounting, and securement.

7. The shield of claim 1 wherein the upper and lower surface of the shield, between the leading edge and the rearward edge of the shield, has a generally differing shape crossing mostly the length of the surface of the shield for strength and/or dynamic effect.

* * * * *